Dec. 22, 1953
L. FAVARA ET AL
2,663,867
DETECTING APPARATUS
Filed Sept. 13, 1950
2 Sheets-Sheet 1
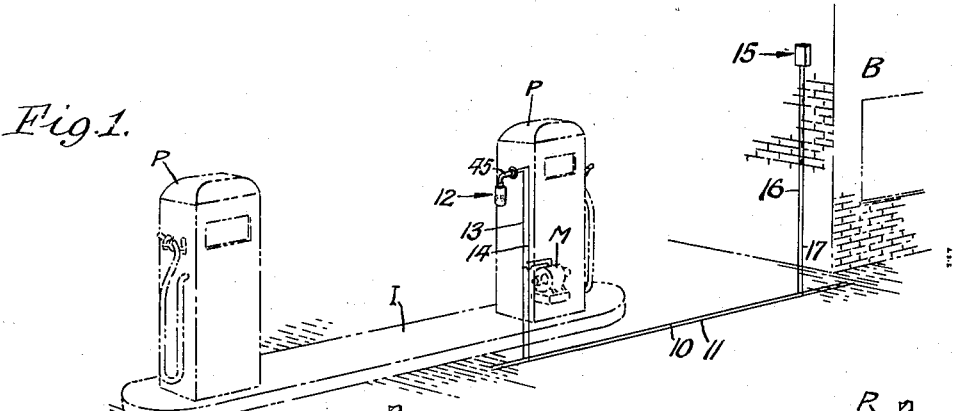
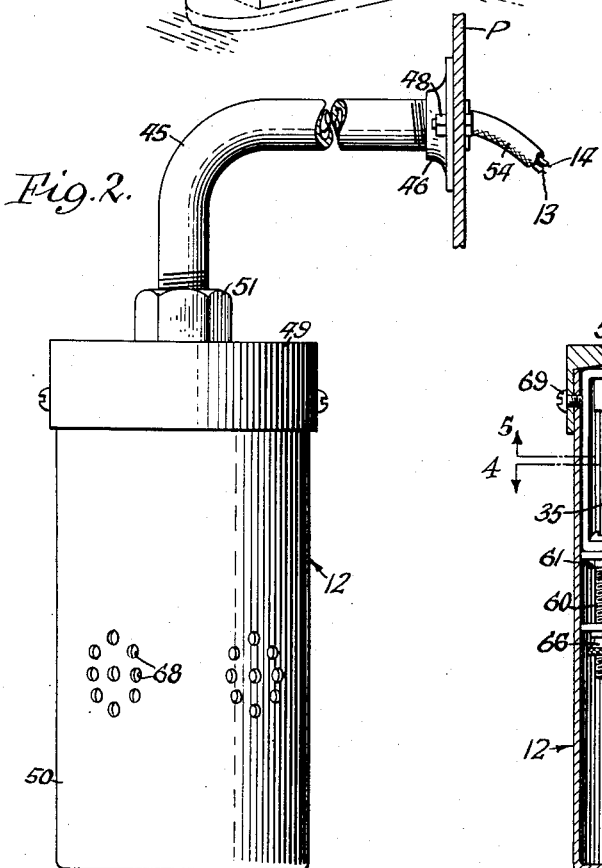
INVENTORS
Louis Favara
Lawrence C. Green
by Popp and Sommer
ATTORNEYS Dec. 22, 1953     L. FAVARA ET AL     2,663,867
DETECTING APPARATUS
Filed Sept. 13, 1950     2 Sheets-Sheet 2
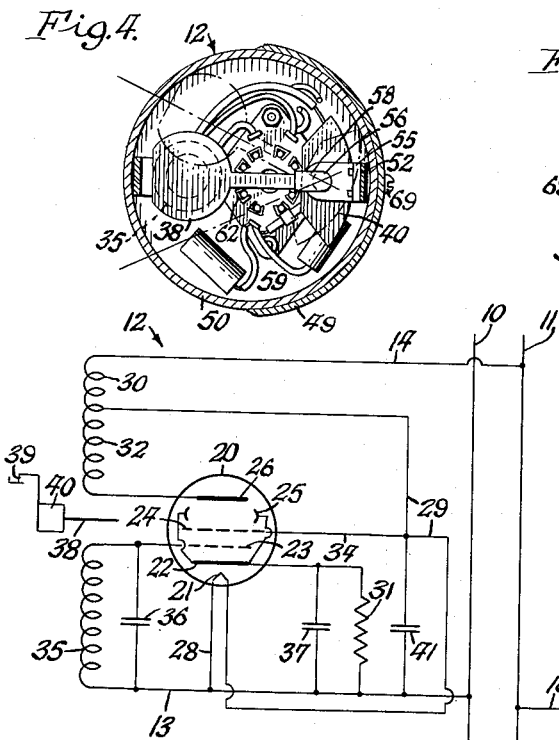
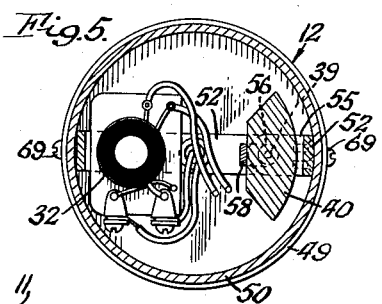
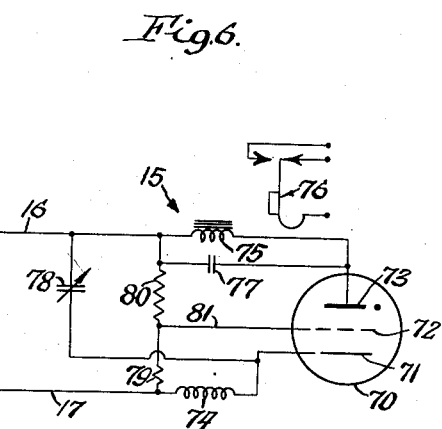
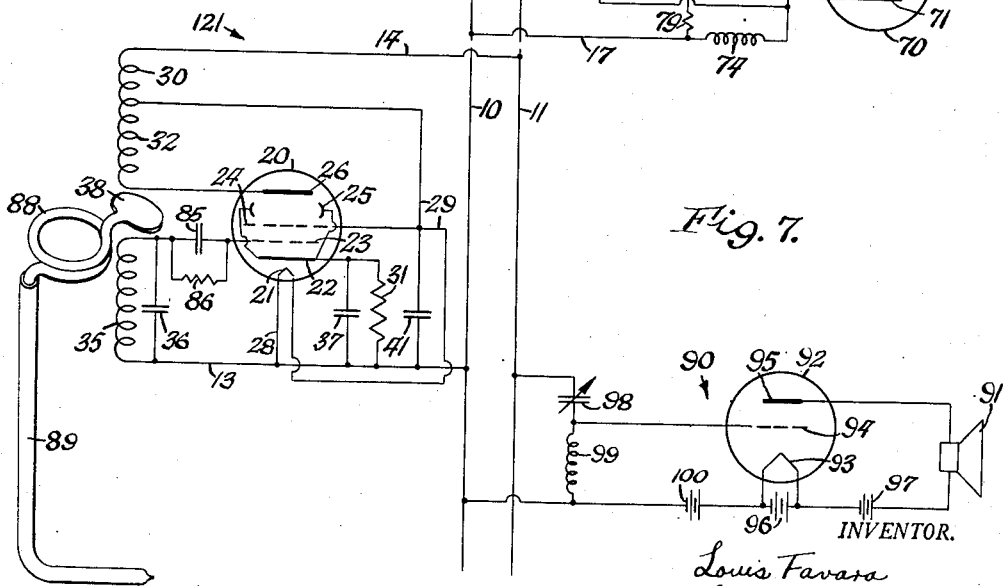
INVENTOR.
Louis Favara
by Lawrence C. Green
Popp and Sommer
ATTORNEYS Patented Dec. 22, 1953

2,663,867

UNITED STATES PATENT OFFICE 2,663,867

DETECTING APPARATUS

Louis Favara and Lawrence C. Green,
Buffalo, N. Y.

Application September 13, 1950, Serial No. 184,626

5 Claims. (Cl. 340—310)

This invention relates to detecting apparatus and more particularly to a detecting system associated with electrical power supply lines.

The principal object of the invention is to provide detecting apparatus which generates and transmits a signal over electrical transmission lines to a receptive device and which effects a change in the signal in response to the movement of an object into a predetermined area of detection thereby to actuate a device controlled by said receptive device.

Another object is to provide such detecting apparatus which derives its power for operation from electrical power supply lines which also serves as the transmission lines for the signal generated.

Another object is to provide such detecting apparatus in which the signal transmitting and receiving means may be provided as physically independent units and thereby permit independent coupling of the transmitter and receiver units to the existing electrical power supply lines in an establishment and with one unit remotely located from the other.

Another object is to provide such detecting apparatus which does not interfere with the normal intended use of the electrical power supply lines as for lighting and heating purposes nor does such use of the lines interfere with the operation of the detecting apparatus.

Another object is to provide such detecting apparatus which may be operated on either alternating or direct current.

Another object is to provide such detecting apparatus in which the detector unit is extremely simple in construction employing a minimum of parts, compact, relatively inexpensive to manufacture and not likely to get out of order or require repairs.

Our invention is especially suitable for use in connection with gasoline service stations to detect the approach of an automobile or other vehicle to a gas pump or other service location and apprise the attendant so that he will be aware of the automobile's presence, although the invention has many other applications and illustration of the application to a gasoline service station is not intended as limitative of the scope of the invention.

In the herein disclosed application of the present invention, the presence of an automobile can be detected and a signal given to the attendant without requiring the automobile to engage any physical part of the detecting apparatus, if desired. Such an arrangement has obvious advantages over present types of alarm devices used in service stations which include temporarily or premanently located members adapted to be run over by the automobile.

Still further objects and advantages of our invention will be apparent from the following description and accompanying drawings in which:

Fig. 1 is a phantom perspective fragmentary representation of a gasoline service station including pumps on an island and a station office building and showing in elevation and in combination with the service station, detecting apparatus embodying the preferred form of our invention.

Fig. 2 is a side elevational view, on a greatly enlarged scale, of the detector unit shown mounted on the side of one of the pumps in Fig. 1.

Fig. 3 is a fragmentary vertical sectional view of the detector unit shown in Fig. 2.

Figs. 4 and 5 are horizontal transverse sectional views thereof taken on the correspondingly numbered lines of Fig. 3.

Fig. 6 is a wiring diagram of the electrical circuit embodied in the preferred form of the detecting system shown in Figs. 1-5.

Fig. 7 is a wiring diagram of an electrical circuit embodying a modified form of the invention.

Figs. 1-6

Referring to Fig. 1, the service station is illustrated as having an island I with a pair of pumps P, P arranged thereon and an office building B located some distance from the island I. A pair of electrical power supply lines 10 and 11 are shown as running underground from the building B to the island for supplying electrical energy to the electrically operated equipment on the island such as the pump motor M. The source of electrical energy which may be either of the alternating or direct current types and to which the lines 10, 11 are connected, is not shown. In general it might be said that the lines 10, 11 are part of the conventional electrical wiring system of the service station.

The detector unit 12 forming part of our invention is shown as mounted on the side wall of one of the pumps P and is connected with the power supply lines 10, 11 by the branch lines 13 and 14. This detector unit 12 is adapted to generate a signal of radio frequency and impress this signal on the lines 10, 11. This signal is received by a receptive device or receiver 15 connected with the power supply lines 10 and 11 by branch lines 16 and 17. The receiver 15 is arranged in any desired place as in the building B and includes some sort of audible, visual or other suitable type of alarm device for indicating to the attendant that a vehicle is at the island I. When a vehicle approaches the island I such as for refueling the detector unit 12 is caused to effect a change in its output which operates to actuate the alarm device.

In the form of the invention shown in Figs. 1–6, the detector unit 12 includes an oscillatory circuit the oscillation of which is under control of a movable magnet. Accordingly when a magnetically permeable object such as a vehicle approaches within a predetermined range of the magnet the magnet moves thereby causing the oscillatory circuit either to oscillate, stop oscillating or change its frequency and transmit such change over the existing electrical lines to the receiver 15 which thereupon actuates the alarm device.

Referring to Fig. 6, the circuit of the detector unit 12 there shown includes an indirectly heated beam tetrode thermionic tube 20 having a filament 21, cathode 22, control grid 23, screen grid 24, concentrating plates 25 and a plate 26. The filament 21 is arranged across the branch lines 13 and 14 and is heated by current passing therethrough. Thus a line 28 connects one side of the filament 21 with the branch line 13 and a line 29 connects the other side of this filament through a coupling or pick-up coil 30 to the other branch line 14.

The cathode 22 and plate 26 are arranged across the branch lines 13 and 14. Thus a bias resistor 31 connected with the branch line 13 is arranged in series with the cathode 22, and a tickler or plate coil 32 connects the plate 26 in series with the coupling or pick-up coil 30 which in turn is connected with the branch line 14. A cathode by-pass capacitor 37 is arranged in parallel with the bias resistor 31. A blocking capacitor 41 is arranged in series with the coupling or pick-up coil 30 and is shown as connected to the lines 13 and 29.

The concentrating plates 25 are internally connected with the cathode 22 and these plates tend to keep the beam of electrons emitted by the cathode in a concentrated beam directed toward the plate 26.

The screen grid 24 is connected with line 29 through line 34 and hence is connected with the branch line 14 through coupling coil 30.

The control grid 23 is connected with the branch line 13 through a grid coil 35 and a capacitor 36 is connected in parallel with the grid coil 35. Thus a resonant tank circuit is arranged between the branch line 13 and the control grid 23.

The grid coil 35 and plate coil 32 are arranged in coaxial relation but slightly spaced apart so as to be capable of being inductively coupled. A shield or vane 38 preferably of conductive non-magnetic material such as copper, is arranged between the coils 32 and 35. This shield or vane 38 is pivotally mounted on an upstanding pin or spindle 39 so as to be capable of swinging back and forth in a horizontal plane. The pivoted vane structure carries a magnet 40 of the permanent type. The normal position of the shield 38 is shown as being centrally between the coils 32 and 35 although the shield may normally have an off center position as hereinafter considered. In this illustrated central position of the shield effective transformer action between these coils 32 and 35 is prevented. However, upon the shield swinging laterally to either side of this position effective flux interlinkages between the coils 32 and 35 take place.

As to the operation of the oscillatory circuit shown in Fig. 6, it will be seen that plate current flowing through the cathode resistor 31 causes a voltage drop which, with the connections shown, has the proper polarity to bias the grid 23 negatively with respect to the cathode 22. With the tank circuit including the grid coil 35 and capacitor 36 resonating, varying or resonating voltages are applied to the control grid 23 thereby causing a resonating current to be established in the plate circuit which includes the plate or tickler coil 32. If this coil 32 is permitted to be inductively coupled with the grid coil 35, as when the shield 38 is swung to either side of its normal central position between these coils, a feedback to the grid coil from the tickler coil is effected and the circuit oscillates. The constants of the grid coil 35 and capacitor 36 determine the frequency at which the circuit oscillates and this is preferably in the range of 50 to 60 kilocycles, although the frequency may be higher or lower. It will be seen that when the shield 38 is arranged centrally between the coils 32 and 35, the circuit does not oscillate but as soon as this shield moves laterally to permit of effective inductive coupling between these coils, the circuit oscillates.

A line coupling circuit including the pick-up coil 30 and blocking capacitor 41 applies the R. F. signal developed by the oscillating circuit to the branch lines 13 and 14 and these in turn transmit this signal to the power supply lines 10 and 11, from which the signal can be received by the receiver unit 15 which is tuned to the frequency of this signal.

It will thus be seen that with the shield 38 in its normal central shielding position, as shown in Figs. 3, 4 and 6, the oscillatory circuit is not oscillating but as soon as a motor vehicle which is a magnetically permeable object pulls up alongside the island I, the equilibrium of the magnet M will be upset and the shield 38 will be caused to swing laterally partially out from between the coils 32 and 35 and permit the circuit to oscillate.

Initially the detector unit 12 is installed and oriented so that the neutral position of the shield or vane 38 which is under control of the permanent magnet 40 is precisely between the superposed coils 32 and 38 (Figs. 3 and 4). Since all of the station equipment, such as the pumps P, the station building B, etc. are in place, this orientation properly compensates for magnetic deviation.

The structural details of the detector unit 12 permitting of this orientation are preferably constructed as follows:

A support arm 45 in the form of a length of pipe having a right angle bend and externally threaded at both ends, is shown as having one end screwed into a pipe flange 46 secured as by bolts 48 to the side wall of one of the pumps P. The other end of the support arm 45 depends and screws into a threaded hole in a cap 49 for a can-like housing 50. A lock nut 51 is arranged on the threaded end of the pipe 45 above the cap 49. With the lock nut 51 loosened it will be seen that the cap 49 can be turned through any angle desired and when the adjustment is so made the lock nut is tightened down against the cap and prevents it from turning relative to the pipe.

All of the electrical apparatus arranged within the housing 50 is shown as carried by the cap 49. For this purpose a U-shaped chassis bar 52 is arranged with its cross part against the lower surface of the cover portion of the cap 49 and held in this position by a pair of screws 53, 53. The cross part of the chassis bar 52 is provided with a hole through which the lead-in cable 54 containing the branch lines 13 and 14 extends. This cable 54 also extends through the hollow support arm 45. The tickler or plate coil 32 is also hung from the cross part of the chassis bar 52 in any suitable manner.

One depending leg of the chassis bar 52 carries a bracket 55 on which the upstanding spindle 39 is mounted. The upper end of this spindle 39 is pointed and received in a socket type bearing 56 mounted on the outer end of a horizontal arm of a support member 58 to which the shield or vane 38 is suitably connected, as shown in Fig. 3. The lower end of this support member 58 has a laterally extending arm on which the permanent magnet 40 rests and is connected thereto. Thus the shield 38, support member 58, magnet 40 and bearing 56 from a unitary structure so balanced that it is free to pivot about the axis of the spindle 39 with the plane of the flat shield substantially horizontal.

Arranged below the tickler or plate coil 32 and coaxial therewith is the grid coil 35 which is suitably mounted on a disk 59 connected to the inwardly turned ends of the chassis bar 52 by depending screws 60 and nuts 61. This disk 59 corresponds to the inside diameter of the housing 50 and therefore serves as a partition forming a closed off compartment in the upper part of the housing and in which most of the electrical apparatus is arranged.

The disk 59 also carries a socket 62 into which the conventional contact prongs of the tube 20 are inserted. The tube 20 is shown as carried in an inverted position and its base 63 is of slightly larger diameter than the bulb portion 64. Against the shoulder so formed between portions 63 and 64, a weather disk 65 is fitted. This disk 65 corresponds to the inside diameter of the housing 50 and is provided with a hole through which the bulb portion 64 extends and also a pair of diametrically opposite small holes through which the screws 60 extend. Nuts 66 are arranged on these screws 60 below the disk 65 and bear thereagainst to hold the disk against the downwardly facing shoulder on the base 63 of the tube 20.

It will be noted that the bulb portion 64 of the tube 20 which contains the various electrical elements which heat up when the tube is operating, is arranged in a compartment at the lower end of the housing 50. To dissipate the heat generated by the tube 20, perforations 68 are provided in the side wall of the housing 50 as well as in the bottom. Any snow or rain entering the lower compartment is kept from moving into the upper part of the housing by the disk 65.

The housing 50 is preferably removable and to permit of this the depending annular skirt of the cap 49 which surrounds the upper end of the housing is shown as provided with holes to receive screws 69 which screw into threaded holes provided in the housing, as shown in Fig. 3.

Due to the magnet assuming a certain position in respect of its magnetic environment when the detector unit is installed in a particular location, it will be seen that the housing 50 and cap 49 therefor and their contents can be turned after first loosening the lock screw 51 until the shield 38 is arranged centrally between the coils 32 and 35, as shown in Figs. 3 and 4. Thereafter the lock nut 51 is tightened down against the cap 49 to hold the adjustment. While the magnet 40 is shown as rigidly connected with the shield or vane 38, this shield may be adjustably mounted on the magnet, if desired, so that orientation of the shield with respect to the coils 32 and 35 would require merely turning the shield or vane relative to the magnet and this would obviate the need for turning the detector unit as a whole as shown.

Any suitable type of receiver unit can be associated with the power supply lines 10 and 11 to receive the signal generated by the detector unit 12. Referring to Fig. 6, the receiver unit 15 is shown as including a gas filled triode 70 which has a cathode 71, starting anode 72 and plate anode 73. The cathode 71 is connected to the branch line 17 through a coil 74 and the plate anode 73 is connected to the other branch line 16 through the coil 75 of a relay 76 the armature of which pulls up to close a circuit through any suitable type of audible or visual alarm device (not shown). A by-pass capacitor 77 is connected across the coil 75. A variable capacitor 78 is connected between the branch line 16 and the line which connects the cathode 71 with the coil 74. A pair of resistors 79 and 80 of different ohmic values are connected in series across the branch lines 16 and 17 and a line 81 connects the starting anode 72 with the line between the resistors 79 and 80.

As to the operation of the receiver unit 15, the resistors 79 and 80 across the branch lines 16 and 17 create a potential across the starting anode 72 and cathode 71 which effectively prevents firing of the tube 70. However when the receiver is tuned by adjustment of the variable capacitor 78 to the R. F. signal being transmitted by the detector unit 12, an R. F. potential is superimposed across the starting anode 72 and cathode 71 to fire the tube 70 and cause current to flow through the coil 75. This actuates the relay 76 and in turn the alarm device (not shown). When the detecting system is installed in a service station the variable capacitor 78 is adjusted so as to tune the resonating circuit in the receiver to the R. F. signal generated by the detector unit 12. No further adjustment of this variable capacitor is required for the subsequent intermittent operation of the detecting system.

While the normal position of the shield or vane 38 has been described as being centrally between the coils 32 and 35 so as to prevent effective inductive coupling thereof and the motion of the vane laterally from this normal position has been used to start oscillation, it is possible conversely to use vane displacement to stop the oscillator or nearly so or to change its frequency.

The ability of the shield or vane 38 to change the permeability of the space surrounding the coils 32 and 35, their inductance and therefore the frequency of the oscillator can be utilized to make these different modes of control possible. When the vane 38 is interposed centrally between the coaxial coils 32 and 35 as shown, it reduces the permeability of the space surrounding these coils so as to cause the oscillator to stop or nearly stop oscillating. When the vane is made to move in either lateral direction it increases the permeability of said space and therefore permits the necessary coupling of the coils 32 and 35 to sustain oscillations at a frequency dependent upon the relation of grid inductance to grid capacitance. It will be seen that lateral movement of the vane 38 in either direction will equally effect the same inductive change for a given deflection of the vane. In other words, equal changes in permeability take place for equal deflective excursions of the vane in opposite directions, the direction depending upon the polarity of the permeable object affecting such change.

At a sufficient displacement of the vane 38 relative to the axis of the coaxial coils 32 and 35 and where sufficient inductive coupling is derived from such displacement and where oscillation can be sustained, the vane can by further deflection still influence the frequency of these oscillations because of the aforementioned variable inductance condition, whereby the permeability of the space surrounding these coils is still affected. If when the vane were to move laterally still farther it will be seen that the frequency of the oscillator would change. Keeping in mind that the receiver 15 has been fed an R. F. impulse at the frequency to which it was tuned, which fired the trigger tube 70 and gave an alarm, further deflection of the vane 38 will change the frequency sufficiently beyond the receiver's frequency acceptability so as to cause the firing action of the receiver's trigger tube 70 to cease.

It is to be understood that the change of the oscillator's frequency resulting from the deflections or displacements of the vane in either direction can be utilized by suitable adjustments of the receiver. The adjustment of the receiver will determine which change is used. In some cases where it would be desirable to have the oscillator continuously in a state of oscillation and a signal sent over the transmission lines continuously, and the receiver in an energized condition, then the vane could be positioned slightly to one side of the center of the coaxial coil relationship so as to keep the circuit in an oscillating condition. In such a case, when a magnetically permeable object causes the vane to deflect in either direction depending upon the polarity of said object, the frequency of the oscillator would change or it would stop oscillating, thereby causing a change in the receiver relative to its preadjustment, that is the frequency control adjustment of capacitor 78. The reason this adjustment of capacitor 78 determines the normal position at which the vane should be set is that the inductance 74 and capacitor 78 determine the resonant frequency at which the receiver is tuned or will accept a R. F. signal.

It will therefore be seen that if the transmitter oscillator is made to be normally out of oscillation and to start with deflection of the vane to either side as shown, this tuned circuit of the receiver will accept the signal and initiate the trigger action of the tube 70 and subsequently cause an alarm signal to be given. However, with the off-center position of the vane as the normal position thereof, the oscillator is sending out an R. F. signal at all times and the receiver is tuned to such signal until such time as the vane is caused to deflect to either side of such position to stop the oscillation of the circuit in one deflective direction, i. e. precise interposition between coils, or to change the frequency of the oscillator in the other deflective direction, i. e. farther away from precise interposition between the coils. The receiver having been initially tuned to the continuous R. F. signal receives no R. F. signal in either case. In the one case no signal is transmitted. In the other case of the frequency changing, the receiver's resonant circuit no longer responds to the changed frequency causing the trigger tube 70 to cease firing and subsequently causing an alarm to be given by the back contacts of the relay 76. Thus the deenergization of the tube 70 can be used to actuate the alarm device.

*Fig. 7*

In some cases it may be desirable to have the alarm indicated by an audible annunciation from a loudspeaker. This may be accomplished by modulating the transmitter by frequencies within an audible range and to provide a re-receiver having a vacuum tube or rectifier which picks up the signal impulses and converts them into usable power impulses which may be used to actuate a loudspeaker or other suitable apparatus.

Such a modified detecting system is shown in Fig. 7 as having a detector unit 121 which is similar in all respects to the detector unit 12 of the form of the invention shown in Figs. 1–6 except for the different means for actuating the shield 38 and further except for the addition of a capacitor 85 and resistor 86 in the grid circuit. Accordingly parts of the detector unit 121 have been indicated by the same reference numerals used to designate the corresponding parts in the detector unit 12 and the description of the operation of the detector unit 12 is intended as applicable to the detector unit 121 except for the differences hereinafter noted.

As to the shield 38 in the detector unit 121, this shield is actuated by a coiled tube 88 to one closed end of which the shield is rigidly connected. The other open end of this coiled tube 88 is connected to the open end of a flexible hose 89 such as one made of rubber which may be arranged on the ground and adapted to be run over by the wheel of the vehicle whose presence is thereby detected. The free end of this flexible hose 89 is closed and both the hose 89 and tube 88 are filled with air. It will thus be seen that when the flexible hose 89 is run over this hose will collapse in part and thereby increase the pressure of the air confined within this hose and the coiled tube 88. This increased pressure tends to uncoil or straighten out the coiled tube 88 and in doing so moves the end thereof carrying the shield 38 thereby moving this shield at least partially from between the coils 32 and 35 thereby permitting the oscillatory circuit to oscillate as previously described in connection with the preferred form of the invention shown in Figs. 1–6.

The detector unit 121 is preferably still mounted adjacent the pump P so that the length of flexible hose 89 would be relatively short as compared to the flexible hoses used in conventional pneumatic alarm devices in which such flexible hose must run along the ground from the island I to the interior of the building B.

As to the grid capacitor and resistor 85 and 86 respectively, their function is to interrupt the carrier or R. F. signal generated by the oscillatory circuit of the detector unit 121 at the desired rate or frequency. When oscillations start in the oscillatory circuit of the detector unit 121 as by the shield 38 being swung to one side, the action of the capacitor is to carry the R. F. to the grid 23 which in turn gradually becomes more negative due to the accumulation of electrons thereon until the flow of electrons from the cathode 22 to the plate 26 is interrupted. Thus on the positive half of the R. F. cycle the capacitor gradually becomes charged to a more negative value due to the rectifying action of the grid 23 and cathode 22. When the grid 23 has become sufficiently negative it interrupts or stops the plate current flow. When the tube 20 is blocked in this manner the resistor 86 conducts the charge off the capacitor 85 creating a condition which will enable the tube to resume oscillation. The constants of the capacitor 85 and resistor 86 determine the rate or frequency at which the oscillator is interrupted, this rate being preferably within the audible range.

The modulated signal so produced is transmitted over the power lines 10 and 11 in the same manner as with the detector unit 12.

These signal impulses are converted by a receiver indicated generally at 90 into direct current impulses which are capable of actuating a loudspeaker 91 or other suitable apparatus. The receiver 90 is illustrated as one of extremely simplified type and it will be understood that any other suitable type of receiver may be used.

The receiver 90 is shown as including a thermionic tube of the triode type 92 having a filament cathode 93, grid 94 and plate 95. The cathode 93 is heated by an A battery 96. The plate 92 is connected in series with the loudspeaker 91 and also a B battery 97. The grid 95 is connected to a variable capacitor 98 and a coil 99 which are arranged in series and connected across the power lines 10 and 11. Also connected with the grid 95 is a C battery 100 to bias the grid and prevent plate current flow unless an R. F. signal of the frequency to which the receiver is tuned by adjustment of the variable capacitor 98, is received.

When the signal impulses generated by the detector unit 121 are received by the tuned receiver 90, and R. F. potential is imposed on the grid 94 which causes plate current flow at a frequency corresponding to that of the modulated R. F. This interrupted plate current flow actuates the diaphragm of the loudspeaker 91 at said frequency which being within the audible range causes the loudspeaker to emit a sound. This loudspeaker can be located in any desired place.

It will therefore be seen that the present invention provides a detecting system which is exceedingly simple and which utilizes existing electrical power supply lines thereby permitting the detector and receiver units of the system to be conveniently located at remote points one from the other.

As to the detector unit of both illustrated forms of detecting apparatus, it will be seen that its circuit is simple and includes effective means of coupling its output to the power lines so that undesirable instability caused by the varying capacitance and inductance of the lines which might cause these lines to resonate at a frequency close to the frequency of the transmitter at times, is overcome. The resonance of the power lines is due chiefly to the insertion of the coupling coil and coupling capacitor combination necessary to transmit the R. F. signal to the power lines at a voltage and current which will carry over such lines.

The present invention provides a novel means for reducing this undesirable condition of the power lines' resonating which if permitted would cause the oscillator to oscillate regardless of the position of the shield. Coupling to the oscillatory circuit is accomplished by using in the plate circuit a tapped coil one end of which is connected directly to one side of the line and the other end of which is connected to the plate or anode of the tube, the tap being connected to a by-pass capacitor which connects directly with the other side of the line. The filament or heater of the tube is connected directly across the by-pass capacitor. It will therefore be seen that all the power used by the tube is drawn through the line coupling portion of the coil, and the by-pass capacitor is shunted by the resistance of the heater or filament.

The advantage in such a circuit is that the capacitor-coil combination coupled to the line which normally tends to make the line, capacitor and coil combination resonate at a frequency close to that of the oscillatory circuit and cause instability of the detector unit, is reduced by the lowering of the efficiency of this undesirable resonant condition of the combination by introducing this parallel load resistance to the capacitive element of the circuit. In this way a situation which would be detrimental to the operation of the detector unit is reduced making it possible to reduce the number of parts and operations in the production of this unit.

It will also be seen that the shield between the tickler and grid coils of the oscillatory circuit can be actuated by any suitable means such as magnetically or pneumatically as shown or by mechanical means or otherwise.

We claim:

1. In detecting apparatus, a detector comprising a frame, a member supporting said frame, a transmitter arranged on said frame and comprising an oscillator having a thermionic tube and grid and plate coils therefor, said coils being arranged on said frame substantially coaxially and in vertically spaced and inductive relation, a magnet movably mounted on said frame and arranged for pivotal movement in a substantially horizontal plane, a shield carried by said magnet movable thereby in a substantially horizontal plane and arranged between said coils to control the inductive coupling of said coils, said magnet being actuated in response to the approach of a magnetically permeable object within a predetermined area of detection and arranged to move said shield so as to effect a change in the inductive coupling of said coils, a housing surrounding said transmitter, the bulb portion of said thermionic tube projecting downwardly, a partition member carried by said frame and having an opening through which said bulb portion projects, said housing having openings below said partition member to permit the passage of air therethrough to dissipate heat generated by said bulb portion, and means arranged to permit adjustment of said magnet relative to said coils whereby said magnet may be oriented initially to its magnetic environment so as to arrange said shield in effective position between said coils.

2. In detecting apparatus, a transmitter connected with electrical power supply lines to receive therefrom its power for operation and arranged to impress a signal on said power lines for transmission thereover, said transmitter comprising an oscillatory circuit including a thermionic tube having a cathode, plate and grid, a resonant circuit connecting said grid with one of said lines and including a coil and capacitor, said cathode being connected with said one of said lines, a tickler coil arranged in inductive relation with said grid coil and connecting said plate to the other of said lines, a line coupling circuit connected with said lines to impress the signal generated by said oscillatory circuit on said lines and including a pick-up coil and a blocking capacitor in series, said pick-up coil being arranged in inductive relation with one of the other of said coils, a movable shield arranged to control the inductive coupling of said grid and tickler coils, and means actuated in response to the approach of an object within a predetermined area of detection and arranged to move said shield so as to effect a change in the inductive coupling of said grid and tickler coils.

3. The combination as set forth in claim 2, wherein said means includes a movable magnet connected to said shield and which is actuated only in response to the approach of a magnetically permeable object within said area.

4. In detecting apparatus, a transmitter connected with electrical power supply lines to receive therefrom its power for operation and arranged to impress a signal on said power lines for transmission thereover, said transmitter comprising an oscillatory circuit including a thermionic tube having a cathode, plate and grid, a resonant circuit connecting said grid with one of said lines and including a coil and capacitor, said cathode being connected with said one of said lines, a plate coil connecting said plate to the other of said lines and tapped to provide a tickler coil and a pick-up coil, said tickler coil being arranged in inductive relation with said grid coil, a blocking capacitor connecting said tap with said one of said lines thereby providing a line coupling circuit including said pick-up coil and said blocking capacitor for impressing the signal generated by said oscillatory circuit on said lines, a movable shield arranged between said grid and tickler coils thereby to control oscillation of said oscillatory circuit, and means actuated in response to the approach of an object within a predetermined area of detection and arranged to move said shield so as to effect a change in the inductive coupling of said grid and tickler coils.

5. The combination as set forth in claim 4, wherein said cathode of said thermionic tube is indirectly heated by a filament which is shunted across said blocking capacitor in said line coupling circuit.

LOUIS FAVARA.
LAWRENCE C. GREEN.

References Cited in the file of this patent
UNITED STATES PATENTS

| Number | Name | Date |
|---|---|---|
| 1,547,242 | Strieby | July 28, 1925 |
| 1,848,866 | Baker | Mar. 8, 1932 |
| 1,951,409 | Havenner et al. | Mar. 20, 1934 |
| 2,234,184 | MacLaren, Jr. | Mar. 11, 1941 |
| 2,312,127 | Shepard, Jr. | Feb. 23, 1943 |